(12) United States Patent
Nodelman et al.

(10) Patent No.: US 7,094,811 B2
(45) Date of Patent: Aug. 22, 2006

(54) ENERGY ABSORBING FLEXIBLE FOAMS PRODUCED IN PART WITH A DOUBLE METAL CYANIDE CATALYZED POLYOL

(75) Inventors: Neil H. Nodelman, Upper St. Clair, PA (US); David A. Radovich, Pittsburgh, PA (US); Albert Magnotta, Monaca, PA (US); Carl E. Holsinger, Freedom, PA (US)

(73) Assignee: Bayer Corporation, Pittsburgh, PA (US)

( * ) Notice: Subject to any disclaimer, the term of this patent is extended or adjusted under 35 U.S.C. 154(b) by 280 days.

(21) Appl. No.: 10/263,536

(22) Filed: Oct. 3, 2002

(65) Prior Publication Data

US 2004/0068021 A1  Apr. 8, 2004

(51) Int. Cl.
*C09J 9/00*  (2006.01)
*C08G 18/28*  (2006.01)

(52) U.S. Cl. ...................... 521/174; 521/130
(58) Field of Classification Search ............. 521/130, 521/174
See application file for complete search history.

(56) References Cited

U.S. PATENT DOCUMENTS

| | | |
|---|---|---|
| 3,427,256 A | 2/1969 | Milgrom |
| 3,427,335 A | 2/1969 | Herold |
| 3,829,505 A | 8/1974 | Herold |
| 3,941,849 A | 3/1976 | Herold |
| 4,056,161 A | 11/1977 | Allen, Jr. |
| 4,355,188 A | 10/1982 | Herold et al. |
| 4,472,560 A | 9/1984 | Kuyper et al. |
| 4,477,589 A | 10/1984 | van der Hulst et al. .... 502/169 |
| 4,966,799 A | 10/1990 | Lucca et al. .................. 428/95 |
| 5,068,001 A | 11/1991 | Haussling .................... 156/222 |
| 5,158,922 A | 10/1992 | Hinney et al. .............. 502/175 |
| 5,266,143 A | 11/1993 | Albera et al. ............... 153/245 |
| 5,470,813 A | 11/1995 | Le-Khac ..................... 502/175 |
| 5,605,939 A * | 2/1997 | Hager ........................ 521/137 |
| 5,700,847 A | 12/1997 | Thompson .................. 521/159 |
| 6,008,263 A | 12/1999 | Thompson et al. ......... 521/174 |
| 6,051,624 A * | 4/2000 | Bastin et al. ............... 521/174 |
| 6,063,309 A | 5/2000 | Hager et al. ........... 262/182.24 |
| 6,066,683 A * | 5/2000 | Beisner et al. ............. 521/174 |
| 6,201,035 B1 | 3/2001 | Tuinman et al. ............ 521/174 |
| 6,204,357 B1 | 3/2001 | Ooms et al. ................ 528/409 |
| 6,323,375 B1 | 11/2001 | Hofmann et al. ........... 558/613 |
| 6,337,356 B1 * | 1/2002 | Zaschke et al. ............. 521/174 |

FOREIGN PATENT DOCUMENTS

| | | |
|---|---|---|
| CA | 2 375 285 | 12/2000 |
| EP | 1 316 571 | 6/2003 |
| EP | 1 316 673 | 6/2003 |

* cited by examiner

*Primary Examiner*—John M. Cooney, Jr.
(74) *Attorney, Agent, or Firm*—Joseph C. Gil; Lyndanne M. Whalen; John E. Mrozinski, Jr.

(57) ABSTRACT

Energy absorbing flexible foams can be produced by reacting an isocyanate with a first polyol, prepared at least in part by an active double metal cyanide catalyst and a second polyether polyol is prepared at least in part by a basic or acidic catalyst.

25 Claims, No Drawings

US 7,094,811 B2

ENERGY ABSORBING FLEXIBLE FOAMS PRODUCED IN PART WITH A DOUBLE METAL CYANIDE CATALYZED POLYOL

FIELD OF THE INVENTION

The present invention relates to energy absorbing flexible foam prepared by reacting an organic polyisocyanate with a polyol blend that includes, a first polyol prepared with a double metal cyanide catalyst and a second polyol prepared with a basic or acidic catalyst, in the presence of at least one catalyst and a blowing agent. The present invention also relates to a process for the preparation of an energy absorbing flexible foam prepared by reacting an organic isocyanate with a polyol blend that includes, a first polyol prepared with a double metal cyanide catalyst and a second polyol prepared with a basic or acidic catalyst, in the presence of at least one catalyst and a blowing agent. Further, the present invention relates to uses of flexible foam containing the above-described reaction product.

BACKGROUND OF THE INVENTION

Numerous substrates are known in the art for abating energy and sound produced by appliances and automobiles. Known substrates include non-woven textile fabrics, such as shoddy pads, and foamed polyurethane materials. See for example, U.S. Pat. Nos. 4,056,161; 4,966,799; 5,266,143; and 5,068,001. It is also known in the art to use flexible polyurethane foam as a sound absorbing material. See U.S. Pat. No. 6,337,356. However, it is not known in the art to prepare an energy absorbing flexible foam containing an organic isocyanate, a first polyol prepared with a double metal cyanide ("DMC") catalyst and a second polyol prepared with a basic catalyst.

It is known in the art to use DMC catalysts to produce polyether, polyester and polyetherester polyols, which are useful in polyurethane coatings, elastomers, sealants, foams and adhesions. DMC catalysts are typically obtained by reacting an aqueous solution of a metal salt, such as zinc chloride, with an aqueous solution of a metal cyanide salt, such as potassium hexacyanocobaltate, in the presence of an organic complexing ligand. The preparation of typical DMC catalysts is described, for example in U. S. Pat. Nos. 3,427,256, 3,829,505 and 5,158,922. DMC-catalyzed polyols are typically produced in a batch or semi-batch process, a high molecular weight polyol starter and DMC catalyst are charged to a reactor all at once, heated and then reacted with a small amount of epoxide. After DMC catalyst activation, more epoxide is continuously added to the reactor to complete polymerization.

It is also known in the art to produce molded polyurethane foams having enhanced physical properties from isocyanate-terminated-prepolymers prepared from poly(oxy)alkylene polyether polyols having low unsaturations, as disclosed in U.S. Pat. No. 5,700,847. Similarly, it is known in the art to prepare polyurethane slab or molded foam by the reaction of an isocyanate and a DMC catalyzed polyol in the presence of a catalyst, a chain extender and a surfactant. See U.S. Pat. No. 6,008,263.

Similarly, it is known in the art to produce high resilience (HR) foam prepared by reacting an isocyanate with a poly(oxypropylene/oxyethylene) polyol component manufactured at least in part with a DMC catalyst. See U.S. Pat. No. 5,605,939. HR foams produced in accordance with U.S. Pat. No. 5,605,939 have resiliency values of greater than 50%.

However, there remains a need in the art to produce an energy absorbing flexible foam wherein a portion of the polyol prepared with a basic catalyst can be replaced with a more economical polyol produced with a DMC catalyst.

SUMMARY OF THE INVENTION

An object of the present invention is to prepare flexible foam formulations based on DMC catalyzed polyols, which would offer both value, and performance advantages over conventional foams made with basic polyols or otherwise commonly referred to as KOH catalyzed polyols.

Energy absorbing flexible foams are normally prepared with polyols having a high level of primary OH content. Accordingly, it has presently been found that flexible open cell foams having good processing properties can be prepared with DMC catalyzed polyols which contain low levels of primary OH (<50%). Energy absorbing flexible foams having acceptable physical properties can be formulated by reacting an organic polyisocyanate with a first polyol prepared with a DMC catalyst and a second polyol prepared with a basic or acidic catalyst, in the presence of at least one catalyst and a blowing agent.

The process of preparing polyether polyols with a DMC catalyst is more cost effective than using a KOH catalyst due to significantly reduced alkoxylation times. Also, DMC catalysts can generally be used in low concentrations thereby eliminating the need for the expensive process of catalyst neutralization.

Another advantage of the present invention is that open cell flexible foams can easily be formulated. Typically, the KOH catalyzed polyols produce very tight foams, especially when using MDI as the isocyanate.

Therefore, the present invention is directed to an energy absorbing polyurethane foam prepared by reacting an organic isocyanate with a first polyol prepared with a DMC catalyst and a second polyol which is prepared with a basic or acidic catalyst in the presence of a blowing agent, and a catalyst.

The present invention is directed to a process for preparing an energy absorbing flexible polyurethane foam by reacting an organic polyisocyanate with at least a first and a second polyether polyol in the presence of a blowing agent, such as water, a catalyst(s) and optionally a surfactant and other additives. The present invention is also directed to preparing a flexible foam having energy absorbing properties which is in part, the reaction product of a first polyol prepared with a DMC catalyst and a second polyol prepared with a basic catalyst. Further, the present invention is directed to a flexible foam prepared by reacting an organic isocyanate with a first polyol prepared with a DMC catalyst and a second polyol prepared with a basic catalyst, wherein the first polyether polyol contains from about 20% to about 80% by weight of the total polyol blend

DETAILED DESCRIPTION OF THE INVENTION

The polyurethane foam prepared in accordance with the present invention can be processed at a wide range of isocyanate/polyol equivalent ratios (index). Preferably, the foam of the present invention is prepared with an NCO index in the range of 65 to 105, more preferably, with an NCO index in the range of 75 to 95.

The process to prepare the foam of the present invention provides for preparing a polyol blend. Generally, the polyol blend of the present invention includes at least a first and a second polyol, wherein the first polyol is prepared with a DMC catalyst and the second polyol is prepared with a basic catalyst. The first polyol is present in the range of about 20 to about 80 weight percent of the total polyol blend, preferably 25 to about 65 weight percent. The second polyol is present in the range of about 12 to about 78 weight percent, preferably in the range of about 29 to about 72 weight percent. The polyol blend may also comprise a catalyst(s) in the range of about 0.4 to about 2 weight percent, preferably about 0.6 to about 1.5 weight percent. The polyol blend may also contain a blowing agent in an amount in the range of about 1.0 to about 15 weight percent, preferably about 2.0 to about 4.5 weight percent. Optionally, the polyol blend of the present invention may contain a surfactant in an amount in the range of about 0.1 to about 3.0 weight percent, preferably about 0.3 to about 2.0 weight percent. Optionally, the polyol blend may contain auxiliaries or fillers in an amount in the range of about 0 to about 25 weight percent, preferably about 0 to about 15 weight percent.

Suitable starting polyisocyanate components for use in the present invention include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds include ethylene diisocyanate, 1,4-tetramethylene diisocyanate, 1,6-hexamethylene diisocyanate; 1,12-dodecane diisocyanate, cyclobutane-1,3-diisocyanate; cyclohexane-1,3- and -1,4-diisocyanate and mixtures of these isomers. Additional examples include 1-isocyanato-3,3,5-trimethyl-5-isocyanato-methyl cyclohexane (German Auslegeschrift No. 1,202,785, U.S. Pat. No. 3,401,190), 2,4- and 2,6-hexahydro-toluene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-toluene diisocyanate and mixtures of these isomers are also suitable in the present invention. Diphenyl-methane-2,4'- and/or -4,4'-diisocyanate; naphthylene-1,5-diisocyanate; triphenyl methane-4,4'-4"'-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyiso-cyanates containing carbodiimide groups of the type described in German Patent No. 1,902,007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Offenlegungsschriften Nos. 1,929,034 and 2,004,408; polyisocyanates containing urethane groups of the type described, for example, in Belgian Patent No. 752,261 or in U.S. Pat. No. 3,394,164; polyisocyanates containing acrylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent No. 889,050 are also suitable.

Aromatic polyisocyanates, which are liquid at the processing temperature, are preferably used. Preferred are diphenylmethane diisocyanate and toluene diisocyanate. More preferably, the aromatic polyisocyanates used with the present invention are in the MDI family of isocyanates. Examples of more preferred isocyanates include liquid blends of 2-4' and/or 4-4' isocyanato, diphenylmethane with polyphenyl polymethylene polyisocyanates including derivatives and prepolymers of these isocyanate blends.

Suitable as the first polyol are polyether polyols prepared with a DMC catalyst. DMC catalysts are well known in the art. Suitable DMC catalysts and methods for preparing them are disclosed in, for example, U.S. Pat. Nos. 3,427,256, 3,427,335, 3,829,505, 4,477,589, 5,158,922, 5,470,813, 6,204,357, and 6,323,375, the teachings of which are incorporated herein by reference. The first polyol can be prepared by methods known in the art. For example, a heterocyclic monomer, such as an epoxide, reacts with an active hydrogen containing initiator. Illustrative examples of how to prepare a polyol with a DMC catalysts are disclosed in U.S. Pat. Nos. 3,829,505, 3,941,849, 4,355,188 and 4,472,560, the teachings of which are incorporated by reference.

Generally, the polyols useful as the first polyol of the present invention are produced by polyaddition of alkylene oxides to starter compounds containing active hydrogen atoms. The oxyalkylation of the starter compound is conducted with one or more higher alkylene oxides, such as propylene oxide and butylene oxide. Use of mixtures of ethylene oxide and one or more higher alkylene oxides leads to essentially random copolymers. The ratio of higher alkylene oxide to ethylene oxide may be changed during oxyalkylation to produce multiple block polyols containing blocks of all higher alkylene oxide derived moieties and/or one or more block of higher alkylene oxide/ethylene oxide moieties. Polymerization solely with ethylene oxide should be avoided when employing DMC catalyst. Further details are given in "Ullmanns Encyclopadie der industriellen Chemie", English-language Edition 1992, Vol. A21, pp. 670–671. As starter compounds containing active hydrogen atoms, compounds are used with molecular weights of 18 to 2000 and with 1 to 8 hydroxyl groups. Examples of useful starter compounds include ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, degraded starch and water.

Preferred polyols include, for example, poly(oxy-propylene)polyols, mixed EO/PO polyols, butylene oxide polymers, butylene oxide polymers, butylene oxide co-polymers with ethylene oxide and/or propylene oxide, and poly(oxytetra-methylene) glycols.

The first polyol preferably has an average functionality from 1.9 to 3.0, more preferably, around 2. The first polyol preferably has a hydroxyl number within the range of about 16 to about 112, more preferably, from about 28 to about 56. The first polyol generally has a number average molecular weight with in the range of about 1,000 to about 8,000, more preferably, from about 2,000 to about 4,800. Preferably, polyols useful as the first polyol of the present invention have a primary OH content from about 0 to about 50%.

The second polyol is any polyol prepared by basic catalysts or acidic. The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to starter compounds containing reactive hydrogen atoms such as water, alcohols, diols, triols, etc. Examples of suitable starter compounds include, for example, propylene glycol, glycerin, ethylene glycol, triethanolamine, water, trimethylol-propane, sorbitol, pentaerythritol, bisphenol A, sucrose, ethanolamine, etc., and mixtures thereof.

Mixtures of amine started polyether polyols with hydroxyl started polyether polyols are also suitable as the second polyol in the present invention. If these are used, it is preferred that these are mixtures with tri-functional polyether polyols as described above.

In addition, polyether polyols, which contain high molecular weight polyadducts or polycondensates in finely dispersed form or in solution, may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols. Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

The second polyol preferably has an average functionality from 1.5 to 6.0, more preferably, from 2.5 to 4.0. The second polyol preferably has a hydroxyl number within the range of about 16 to about 112, more preferably, from about 28 to about 56. The second polyol generally has a number average molecular weight with in the range of about 1,000 to about 10,000, more preferably, from about 2,000 to about 6,000. Preferably, polyether polyols useful as the second polyol of the present invention have a primary OH content of greater than 50%, preferably greater than 70%.

The polyol blend used in the present invention should also include a catalyst. Suitable catalysts include, for example, various organic metal compounds, including, for example, tin(II) salts of carboxylic acids, dialkyl tin salts of carboxylic acids, dialkyl tin mercaptides, dialkyl tin dithioesters and tertiary amines and their acid salts which are useful as delayed action catalysts. Such acids include formic acid, 2-ethylhexanoic acid, glycolic acid and acetic acid. Examples of suitable amine catalysts include dimethylcyclohexylamine (e.g. Polycat 8), pentamethyldiethylenetriamine (i.e. Polycat 5), bis[2 (dimethylamino)ethyl]ether (e.g. Niax A-1), dimethylethanolamine (i.e. DMEA), and triethylene diamine (e.g. Dabco 33LV), etc. Of course, it is also possible to use any of the catalysts, which are well known to those skilled in the art of polyurethane chemistry.

The blowing agent can be any blowing agent that accomplishes the objects of the present invention. Suitable blowing agents include liquid $CO_2$ and environmentally acceptable chlorofluorocarbons, highly fluorinated and/or perfluorinated hydrocarbons, and any other suitable physical-blowing agent known in polyurethane chemistry. If the blowing agent is a physical blowing agent it is generally used in an amount from about 3.0 to 10.0 parts per 100 parts of the polyol blend. If the blowing agent is $CO_2$ it is generally used in an amount from about 1.0 to 3.0 parts per 100 parts of the polyol blend. Preferably, the blowing agent is water and is used in an amount from about 1.0 to 6.0 parts, more preferably from about 2.0 to about 4.5 parts, per 100 parts of the polyol blend.

Optionally, any surfactants known in the art can be used in the present invention. Surfactants that can be used in the present invention include polyether siloxanes. The structure of these compounds is generally such that a copolymer of ethylene oxide and propylene oxide is attached to a polydimethyl siloxane radical. Such foam stabilizers are described in, for example, U.S. Pat. No. 2,764,565.

Preferably, silicon surfactants suitable for flexible polyurethane foams are used in the present invention. Surfactants can be used in the present invention in amounts of from about 0.1 to about 3.0% by weight, based on the total weight of the polyol blend. B 4113 LF and B 8715 LF, which are available commercially from Goldschmidt AG and E-9924 which is available from Bayer AG are examples of surfactants which can be used in the present invention.

If desired, further auxiliaries and/or additive can be incorporated into the reaction mixture for producing the energy absorbing flexible foams of the present invention. Suitable auxiliaries or additives include surface-active substances, foam stabilizers, cell regulators, cell openers, fillers, dyes, pigments, flame retardants, hydrolysis inhibitors, fungistatic and bacteriostatic substances and adhesion promoters.

According to the present invention, the components may be reacted together by known processes often using mechanical devices. Details concerning processing apparatus which may be used according to the present invention may be found in Kunststoff-Handbuch, Colume VII, published by Vieweg and Hochtlen, Carl-Hanser-Verlag, Munich, 1966, pages 121–205.

The foaming reaction for producing foam products can be carried out inside molds. In this process, the foamable reaction mixture is introduced into a mold, which may be made of metal such as aluminum or a plastic material such as an epoxide resin. According to the present invention, the desired result can be obtained by introducing a 10% excess (overpack) over the amount just required to fill the mold after the reaction is complete.

The invention is further illustrated but is not intended to be limited by the following examples in which all pads and percentages are by weight unless otherwise specified.

EXAMPLES

In the examples, which follow, the following materials were used:

A) POLYOL A: a glycerin initiated ethylene oxide modified polyether polyol having a molecular weight of 6000, a hydroxyl number of about 28 mg KOH/g, a functionality of 3.0 and a tip containing 13% EO.

B) POLYOL B: a glycerin initiated polyether polyol having a molecular weight of 4,525, a hydroxyl number of about 37 mg KOH/g, a functionality of 3.0 and containing 37% EO.

C) POLYOL C: a DMC produced polyol having an OH number of 35, a nominal functionality of 2, an internal EO of 5%, a tip containing 15% EO in an EO/PO mixed block having an EO/PO weight ratio of 60/40.

D) POLYOL D: a DMC produced polyol having an OH number of 35, a nominal functionality of 2, an internal EO of 5%, a tip containing 15% EO in an EO/PO mixed block having an EO/PO weight ratio of 45/55.

E) POLYOL E: a DMC produced polyol having an OH number of 35, a nominal functionality of 2, an internal EO of 5%, a tip containing 15% EO in an EO/PO mixed block having an EO/PO weight ratio of 75/25.

F) BLOWING AGENT: water

G) CHAIN EXTENDER: 2-methylpentanediamine commercially available from Dupont under the tradename DYTEK A.

H) CATALYST H: a tertiary amine catalyst (70% solution of bis(dimethylaminoethyl)ether) available from OSI, Division of Witco Chemical under the tradename NIAX A1.

I) CATALYST I: a 33% solution of triethylene diamine, commercially available from Air Products under the tradename DABCO 33LV.

J) CATALYST J: a tertiary amine catalyst blend, commercially available from OSI, Division of Witco Chemical under the tradename NIAX A4.
K) SURFACTANT: a polyether polydimethyl siloxane copolymer, commercially available from Bayer AG under the tradename E-9924.
L) ISO1: a 10–15% poly(methylenephenylene) polyisocyanate (MDI) having an NCO content of 32.8, a functionality of about 2.27, and a viscosity of about 30 at 25° C.
M) ISO2: a blend of 4-4' diphenylmethane diisocyanate and an a polymethylene poly(phenyl isocyanate) (polymeric MDI), the blend having an NCO group content of about 32.4%, by weight and a functionality of about 2.42, and a viscosity of about 48 at 25° C.
N) ISO3: a blend of an allphonated modification of 4-4' diphenylmethane diisocyanate (29% NCO) and a polymethylene poly(phenyl isocyanate) (polymeric MDI), the blend having an NCO group content of about 30.2%, by weight and a functionality of about 2.33, and a viscosity of about 78 at 25° C.

Sound absorbing flexible foams were produced on a Research HK Foam machine as ½" pads and 2-inch blocks. A water-heated aluminum mold which measured 10"×10"× 2.5" was first treated with Chem Trend 1189C, a solvent based wax external mold release agent, and then heated to 60° C. Using a Hennecke HK-250 high-pressure foam machine equipped with Rexroth pumps and an MQ-12 mixhead, the reaction mixture was open-poured into the preheated mold. The polyol blend was preheated to 35° C. and the isocyanate component was also preheated to 35° C. All foams were prepared using a throughput of 180 g/sec. A shot time for a 3.0 pcf foam was 1.056 sec. An isocyanate pressure of 1900 psi and a polyol pressure of 1800 psi were used. Foams, submitted for physical properties, were all demolded in 100 seconds. Upon demold, the foams were manually crushed to open the cells and avoid shrinkage.

The catalyst ratio was adjusted so that the ½" thick pads would be stable towards shrinkage. The 10×10×2.5 inch foam blocks were produced at three different indices (75, 85 and 95) per formulation and submitted for physical properties and compared to the Bayfit SA 511 system. As illustrated below Example 1 had the best compression set values and Example 3 had the best overall physical properties.

TABLE 1

Sound Absorbing Foam

| COMPONENTS | EXAMPLE 1 | EXAMPLE 2 | EXAMPLE 3 |
|---|---|---|---|
| POLYOL A | 36.9 | 36.9 | 36.9 |
| POLYOL B | 1.0 | 1.0 | 1.0 |
| POLYOL C | 56.15 | 56.15 | 56.15 |
| BLOWING AGENT | 3.3 | 3.3 | 3.7 |
| CHAIN EXTENDER | 0.5 | 0.5 | 0.5 |
| CATALYST H | 0.29 | 0.29 | 0.29 |
| CATALYST I | .035 | 0.35 | 0.35 |
| CATALYST J | 0.75 | 0.75 | 0.75 |
| SURFACTANT K | 0.5 | 0.5 | 0.5 |
| ISOCYANATE (85 INDEX) | | | |
| ISO 1 | — | — | 52.86 |
| ISO 2 | 48.6 | — | — |
| ISO 3 | — | 52.14 | — |

TABLE 2

Sound absorbing Coefficients (75 Index)

| ASTM E1050 (Skin Towards Source) | BAYFIT SA 511 | EXAMPLE 1 | EXAMPLE 2 | EXAMPLE 3 |
|---|---|---|---|---|
| 250 HZ | 0.095 | 0.10 | 0.1 | 0.09 |
| 500 HZ | 0.215 | 0.22 | 0.245 | 0.20 |
| 1000 HZ | 0.525 | 0.525 | 0.59 | 0.45 |
| 2000 HZ | 0.955 | 0.93 | 0.97 | 0.87 |

TABLE 3

Sound absorbing Coefficients (85 Index)

| ASTM E1050 (Skin Towards Source) | BAYFIT SA 511 | EXAMPLE 1 | EXAMPLE 2 | EXAMPLE 3 |
|---|---|---|---|---|
| 250 HZ | 0.10 | 0.11 | 0.125 | 0.105 |
| 500 HZ | 0.23 | 0.27 | 0.30 | 0.25 |
| 1000 HZ | 0.56 | 0.566 | 0.715 | 0.59 |
| 2000 HZ | 0.985 | 0.85 | 0.995 | 0.98 |

TABLE 4

Sound absorbing Coefficients (95 Index)

| ASTM E1050 (Skin Towards Source) | BAYFIT SA 511 | EXAMPLE 1 | EXAMPLE 2 | EXAMPLE 3 |
|---|---|---|---|---|
| 250 HZ | 0.12 | 0.125 | 0.14 | 0.10 |
| 500 HZ | 0.31 | 0.295 | 0.33 | 0.25 |
| 1000 HZ | 0.695 | 0.70 | 0.695 | 0.57 |
| 2000 HZ | 0.98 | 0.985 | 0.925 | 0.99 |

TABLE 5

Physical Properties (75 index)

| PROPERTIES | BAYFIT SA 511 | EXAMPLE 1 | EXAMPLE 2 | EXAMPLE 3 |
|---|---|---|---|---|
| Air Flow (CFM) | 1.6 | 1.8 | 1.45 | 2.2 |
| 40% CLD | 0.36 | 0.42 | 0.46 | 0.31 |
| Comp. Set. | 16.6% | 21.1% | 28.1% | 30.5% |
| % Elongation | 144 | 97.2 | 110 | 131 |
| Tensile Str. (kPa) | 149 | 100 | 129 | 110 |
| Die C Tear (pli) | 3.1 | 2.1 | 2.6 | 2.5 |
| Density (pcf) | 2.82 | 2.84 | 2.88 | 2.8 |

TABLE 6

Physical Properties (85 index)

| PROPERTIES | BAYFIT SA 511 | EXAMPLE 1 | EXAMPLE 2 | EXAMPLE 3 |
|---|---|---|---|---|
| Air Flow (CFM) | 1.4 | 1.45 | 0.95 | 1.5 |
| 40% CLD | 0.51 | 0.65 | 0.67 | 0.54 |
| Comp. Set. | 15.8% | 22.2% | 31% | 30.1% |
| % Elongation | 129 | 94.5 | 113 | 124 |

TABLE 6-continued

Physical Properties (85 index)

| PROPERTIES | BAYFIT SA 511 | EXAMPLE 1 | EXAMPLE 2 | EXAMPLE 3 |
|---|---|---|---|---|
| Tensile Str. (kPa) | 172 | 134 | 172 | 158 |
| Die C Tear (pli) | 3.55 | 2.77 | 3.37 | 3.65 |
| Density (pcf) | 2.74 | 2.84 | 2.78 | 2.79 |

TABLE 7

Physical Properties (95 index)

| PROPERTIES | BAYFIT SA 511 | EXAMPLE 1 | EXAMPLE 2 | EXAMPLE 3 |
|---|---|---|---|---|
| Air Flow (CFM) | 1.25 | 1.55 | 0.4 | 1.5 |
| 40% CLD | 0.75 | 0.96 | 0.99 | 0.73 |
| Comp. Set. | 15.9% | 19.4% | 31.8% | 23.8% |
| % Elongation | 121 | 94.6 | 109 | 126 |
| Tensile Str. (kPa) | 209 | 184 | 221 | 199 |
| Die C Tear (pli) | 4.2 | 3.7 | 4.2 | 4.4 |
| Density (pcf) | 2.66 | 2.86 | 2.72 | 2.78 |

Ball rebound tests and return values were measured for foams according to the present invention and as illustrated in the Examples below. The foams of the present invention have lower resilience properties at higher densities than flexible foams that would be considered to be high resilient. For a seating application these low values would not be desirable. The foams of this application are nor designed for comfort but rather for energy absorption. One would expect low resilience measurements for foam designed for this type of application.

TABLE 8

Ball rebound test and 25% return value formulation

| COMPONENTS | EXAMPLE 4 | EXAMPLE 5 | EXAMPLE 6 |
|---|---|---|---|
| POLYOL A | 36.9 | 36.9 | 36.9 |
| POLYOL B | 1.0 | 1.0 | 1.0 |
| POLYOL D | 56.15 | — | — |
| POLYOL E | — | 56.15 | 56.15 |
| BLOWING AGENT | 3.3 | 3.7 | 3.8 |
| CHAIN EXTENDER | 0.5 | 0.5 | 0.5 |
| CATALYST H | 0.29 | 0.29 | 0.29 |
| CATALYST I | 0.35 | 0.35 | 0.35 |
| CATALYST J | 0.75 | 0.75 | 0.75 |
| SURFACTANT | 0.5 | 0.5 | 0.5 |

| ISOCYANATE (75 INDEX) | EXAMPLE 4 | EXAMPLE 5 | EXAMPLE 6 |
|---|---|---|---|
| ISO 1 | — | — | 47.72 |
| ISO 2 | — | 46.64 | — |
| ISO 3 | 46.01 | — | — |

| ISOCYANATE (85 INDEX) | EXAMPLE 4 | EXAMPLE 5 | EXAMPLE 6 |
|---|---|---|---|
| ISO 1 | — | — | 54.08 |
| ISO 2 | — | 52.86 | — |
| ISO 3 | 52.14 | — | — |

| ISOCYANATE (95 INDEX) | EXAMPLE 4 | — | EXAMPLE 6 |
|---|---|---|---|
| ISO 1 | — | — | 60.45 |
| ISO 2 | — | — | — |
| ISO 3 | 58.27 | — | — |

TABLE 9

Physical Properties of the foams produced in accordance with the formulation in Table 8.

| Properties | Exp. 4 Index 75 | Exp. 4 Index 85 | Exp. 4 Index 95 | Exp. 5 Index 75 | Exp. 5 Index 85 | Exp. 6 Index 75 | Exp. 6 Index 85 | Exp. 6 Index 95 |
|---|---|---|---|---|---|---|---|---|
| Airflow | 1.85 | 1.15 | 1.35 | 2.0 | 1.5 | 2.15 | 1.6 | 1.1 |
| 40% CLD | 0.57 | 0.73 | 1.05 | 0.42 | 0.65 | 0.38 | 0.61 | 0.91 |
| Comp. Set (CD) % | 38.6 | 40 | 32.7 | 18.3 | 23.7 | 29.2 | 24.3 | 23.1 |
| % Elongation | 90.2 | 93 | 93.2 | 59.9 | 101 | 133 | 131 | 126 |
| Tensile Strength (kPa) | 107 | 148 | 191 | 98.8 | 139 | 128 | 176 | 217 |
| Die Tear (PLU) | 2.1 | 2.7 | 3.75 | 1.77 | 2.33 | 2.4 | 3.33 | 3.95 |
| Density (PCF) | 2.86 | 2.9 | 2.85 | 2.78 | 2.83 | 2.8 | 2.81 | 2.89 |
| Ball Rebound % | 42 | 43 | 45 | 48 | 49 | 45 | 47 | 48 |
| 25% IFD (lbs/50 sq. in) | 21.54 | 43.06 | 51.62 | 36.05 | 43.93 | 21.01 | 33.42 | 52.35 |
| 25% Return value | 73.12 | 69.25 | 67.81 | 73.86 | 72.28 | 77.71 | 75.63 | 72.10 |

What is claimed is:

1. A process for preparing an energy absorbing flexible foam comprising reacting a) an organic polyisocyanate with b) a polyol blend comprising i) at least a first and a second polyol, wherein the first polyol is prepared at least in part by an active double metal cyanide catalyst and has an average functionality of about 2 and wherein the second polyol is prepared at least in part by a basic or acidic catalyst and has an average functionality from about 1.0 to about 6.0 ii) a blowing agent, and iii) at least one catalyst, wherein the energy absorbing flexible foam has a sound absorption coefficient of about 0.1 at 250 Hz and about 1.0 at 2000 Hz.

2. The process of claim 1, wherein the polyol blend further comprises a surfactant or other additive.

3. The process of claim 1, wherein the first and second polyols are polyether polyols.

4. The process of claim 3, wherein the first polyether polyol has a hydroxyl number of about 28 to about 35.

5. The process of claim 3, wherein the second polyether polyol has a hydroxyl number of about 28 to about 35.

6. The process of claim 1, wherein the first polyol has a primary OH content of about 25 to about 50%.

7. The process of claim 1, wherein the second polyol has a primary OH content of greater than 70%.

8. The process of claim 1, wherein the first polyol comprises from about 20% to about 80% by weight based on the total weight of the polyol blend.

9. The process of claim 1, wherein the organic polyisocyanate is a methylene diphenylene polyisocyanate or a toluenediisocyanate.

10. The process of claim 6, wherein the organic polyisocyanate is a methylene diphenylene polyisocyanate.

11. The process of claim 1, wherein the foam is produced at an NCO index of between 65 and 105.

12. The process of claim 1, wherein the blowing agent comprises water.

13. The process of claim 1, wherein the catalyst(s) is used in an amount of about 0.4 to about 2 wt. % based on the total weight of the polyol blend.

14. An energy absorbing flexible foam comprising the reaction product of:

a) an organic polyisocyanate and b) a polyol blend comprising i) at least a first and a second polyol, wherein the first polyol is prepared at least in part by an active double metal cyanide catalyst and has an average functionality of about 2 and wherein the second polyol is prepared at least in part by a basic or acidic catalyst and has an average functionality from about 1.0 to about 6.0 ii) a blowing agent, and iii) at least one catalyst, wherein the energy absorbing flexible foam has a sound absorption coefficient of about 0.1 at 250 Hz and about 1.0 at 2000 Hz.

15. The foam of claim 14, wherein the polyol blend further comprises a surfactant or other additive.

16. The foam of claim 15, wherein the first and second polyols are polyether polyols.

17. The foam of claim 16, wherein the first polyether polyol has a hydroxyl number of about 28 to about 35.

18. The foam of claim 14, wherein the first polyol has a primary OH content of about 0 to about 50%.

19. The foam of claim 14, wherein the second polyol has a primary OH content of greater than 70%.

20. The foam of claim 14, wherein the first polyol comprises from about 20% to about 80% by weight based on the total weight of the polyol blend.

21. The foam of claim 14, wherein the organic polyisocyanate is a methylene diphenylene polyisocyanate or a toluenediisocyanate.

22. The foam of claim 21, wherein the organic polyisocyanate is a methylene diphenylene polyisocyanate.

23. The foam of claim 21, wherein the foam is produced at an NCO index of between 65 and 105.

24. The foam of claim 14, wherein the blowing agent comprises water.

25. The foam of claim 14, wherein the catalyst(s) is used in an amount of about 0.4 to about 2 wt. % based on the total weight of the polyol blend.

* * * * *